United States Patent
Baxter, III et al.

(10) Patent No.: US 7,853,716 B1
(45) Date of Patent: Dec. 14, 2010

(54) DATA STORAGE SYSTEM HAVING PACKET SWITCHING NETWORK WITH LATENCY ARBITRATION

(75) Inventors: William F. Baxter, III, Holliston, MA (US); Stephen D. MacArthur, Northboro, MA (US); Man Min Moy, Holliston, MA (US); Brett D. Niver, Grafton, MA (US); Yechiel Yochai, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 187 days.

(21) Appl. No.: 11/059,961

(22) Filed: Feb. 17, 2005

(51) Int. Cl.
 *G06F 15/173* (2006.01)
(52) U.S. Cl. .................................................. 709/240
(58) Field of Classification Search ................... 711/118
 See application file for complete search history.

(56) References Cited

U.S. PATENT DOCUMENTS

| | | | | |
|---|---|---|---|---|
| 5,689,728 | A * | 11/1997 | Sugimoto et al. | 710/38 |
| 5,703,875 | A * | 12/1997 | Burnett | 370/381 |
| 6,195,770 | B1 * | 2/2001 | Walton | 714/53 |
| 6,980,552 | B1 | 12/2005 | Betz et al. | |
| 7,073,020 | B1 * | 7/2006 | Black et al. | 711/112 |
| 2002/0083270 | A1 * | 6/2002 | Chilton | 711/130 |
| 2004/0004975 | A1 * | 1/2004 | Shin et al. | 370/471 |
| 2005/0071556 | A1 * | 3/2005 | Walton et al. | 711/114 |
| 2006/0039370 | A1 * | 2/2006 | Rosen et al. | 370/389 |

OTHER PUBLICATIONS

PCI Express Base Specification REV 1.0 Apr. 15, 2003, pp. 90-93 and 95-96.
U.S. Appl. No. 11/059,885, filed Feb. 17, 2005.

* cited by examiner

*Primary Examiner*—Kevin L Ellis
*Assistant Examiner*—Gary W Cygiel

(57) ABSTRACT

A data storage system having a packet switching network, a cache memory, and a plurality of directors, one portion of such directors being adapted for coupling to a host computer/ server and another portion of the directors being adapted for coupling to a bank of disk drives. The plurality of directors and cache memory are interconnected through the packet switching network. Each one of the directors is adapted to transmit different types of information packets to another one of the directors through the network. Each one of the directors is adapted to transmit and receive different types of information packets to another one of the directors or cache memories through the packet switching network. Each one of the cache memories is adapted to receive and transmit different types of information packets to one of the directors through the packet switching network. One type of information packet requires a different degree of latency than another type of information packet. The system includes an arbiter for transmitting the information packets as a function of the latency requirement, a priority assigned to the information packet, and the age of such information packets having been stored in a queue of the transmitting one of the directors, the packet switching network, or one of the cache memories.

3 Claims, 15 Drawing Sheets

FIG. 3 Fabric Switch Unit 14a Block Diagram

Fabric Switch Unit 14a Paths

FIG. 5 Fabric End Point 16 Block Diagram

Fabric End Point 16 Paths

FIG. 7 Input Decoder 62 Processing

FIG. 11 Output Sequencer 71 Selection Flow

FIG. 12 Input Decoder 62 Buffer Management Flow

FIG. 13 Egress Control 92 Processing Flow

DATA STORAGE SYSTEM HAVING PACKET SWITCHING NETWORK WITH LATENCY ARBITRATION

INCORPORATION BY REFERENCE

This application incorporates by reference, in their entirety, the following co-pending patent applications all assigned to the same assignee as the present invention:

| INVENTORS | FILING DATE | SER. NO. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton- | May 17, 2001 | 09/859,659 | Data Storage System Having No-Operation Command |
| Kendell A. Chilton | Jun. 26, 2002 | 10/180,751 | Data Storage System Having Cache Memory Manager |
| John Walton et at. | Sep. 30, 2003 | 10/675,038 | DATA STORAGE SYSTEM HAVING PACKET SWITCHING NETWORK |

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large host computers and servers (collectively referred to herein as "host computer/servers") require large capacity data storage systems. These large computer/servers generally include data processors, which perform many operations on data introduced to the host computer/server through peripherals including the data storage system. The results of these operations are output to peripherals, including the storage system.

One type of data storage system is a magnetic disk storage system having a bank of disk drives. The bank of disk drives and the host computer/server are coupled together through a system interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the interface may also include, in addition to the host computer/server controllers (or directors) and disk controllers (or directors), and a user data cache, comprised of addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

As is also known in the art it is desirable to provide an interface with maximum data bandwidth, minimum system response time and minimum cost.

SUMMARY OF THE INVENTION

In accordance with the present invention, a data storage system is provided having a packet switching network, a cache memory, and a plurality of directors, one portion of such directors being adapted for coupling to a host computer/server and another portion of the directors being adapted for coupling to a bank of disk drives. The plurality of directors and cache memory are interconnected through the packet switching network. Each one of the directors is adapted to transmit and receive different types of information packets to another one of the directors or cache memories through the packet switching network. Each one of the cache memories is adapted to receive and transmit different types of information packets to one of the directors through the packet switching network. One type of information packet requires a different degree of latency than another type of information packet. The system includes an arbiter for transmitting the information packets as a function of the latency requirement (i.e., faster time of transmission through the packet switching system), a priority assigned to the information packet, and the age of such information packets having been stored in a queue of the transmitting one of the directors, the packet switching network, or one of the cache memories.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

These and other features of the invention will become more readily apparent from the following detailed description when read together with the accompanying drawings, in which.

The details of one or more embodiments of the invention are set forth in the accompanying drawings and the description below. Other features, objects, and advantages of the invention will be apparent from the description and drawings, and from the claims.

Like reference symbols in the various drawings indicate like elements.

DETAILED DESCRIPTION

Figure 15:
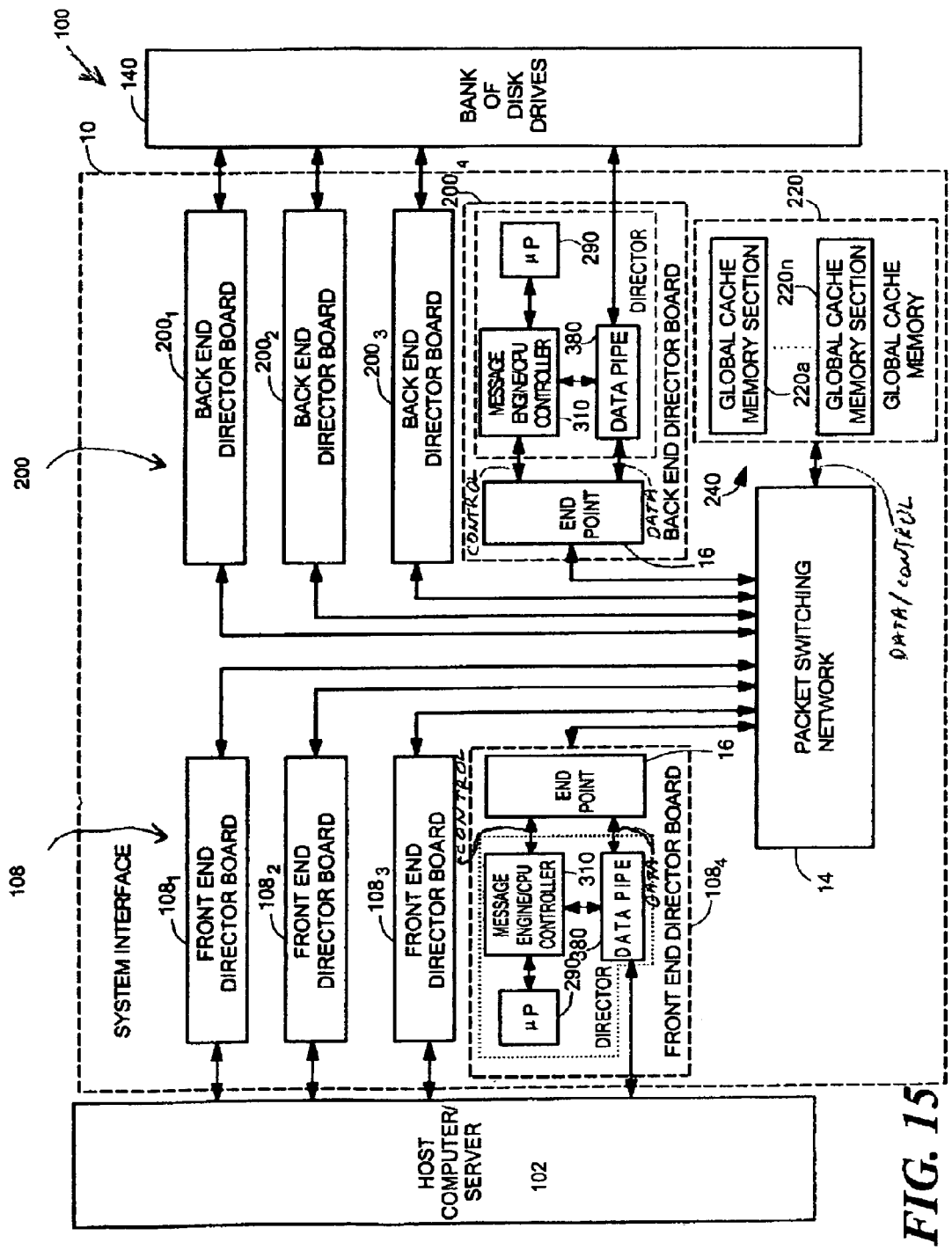
FIG. 15 is a block diagram of a data storage system according to the invention.

Referring now to FIG. 15, a data storage system 100 is shown for transferring data between a host computer/server 102 and a bank of disk drives 140 through a system interface 10. The system interface 10, to be described in more detail in FIG. 1, includes: a front end director section 108 having a plurality of, here for example four, front-end directors $108_1$-$108_4$, coupled to the host computer/server 102; a back end director section 200, having a plurality of, here for example, four, back-end directors $200_1$-$200_4$ coupled to the bank of disk drives 140. The interface 10 includes a data transfer section 240, having a global cache memory 220. The global cache memory 220 includes a plurality of, here, n, global cache memory sections $220_a$-$220_n$, as shown. The front-end and back-end directors $108_1$-$108_4$, $200_1$-$200_4$ and the global cache memory 220 communicate with one another through a packet switching network 14. The packet switching network 14, shown in more detail in FIG. 1, includes crossbar switches herein sometimes referred to as internal packet switching units 14a (FIG. 1) coupled to each other and to the front end director section 108, back end director section 200 and cache memory 220 as described in more detail in copending patent application Ser. No. 10/675,038 referred to above assigned to the same assignee as the present invention, the entire subject matter thereof being incorporated by reference.

The front-end and back-end directors $108_1$-$108_4$, $200_1$-$200_4$ are functionally similar and include a microprocessor (µP) 290 (i.e., a central processing unit (CPU) and RAM), a message engine/CPU controller having a message engine and a memory controller 310; and, a data pipe 380, arranged as shown and described in more detail in co-pending patent application Ser. No. 09/540,828 filed Mar. 31, 2000, inventor Yuval Ofek et al., assigned to the same assignee as the present invention, the entire subject matter thereof being incorporated by reference. Suffice it to say here, however, that the front-end and back-end directors $108_1$-$108_4$, $200_1$-$200_4$ control the transfer of user data between the host computer/server 102 and the bank of disk drives 140 by means of accessing from directors $108_1$-$108_4$, $200_1$-$200_4$ the information contained within the cache memory 220 relating to the cache management, in conjunction with messages passing between the directors $108_1$-$108_4$, $200_1$-$200_4$ through the packet switching network 14. The messages facilitate the user data transfer between host computer/server 102 and the bank of disk drives 140 with such data passing through the global cache memory 220 via the data transfer section 240. More particularly, in the case of the front-end directors $108_1$-$108_4$, the user data passes between the host computer 102 to the global cache memory 220 through the data pipe 380 in the front-end directors $108_1$-$108_4$ and the messages and cache control information pass through the message engine/CPU controller 310 in such front-end directors $108_1$-$108_4$. In the case of the back-end directors $200_1$-$200_4$ the user data passes between the back-end directors $200_1$-$200_4$ and the bank of disk drives 140 and the global cache memory 220 through the data pipe 380 in the back-end directors $200_1$-$200_4$ and again the messages pass through the message engine/CPU controller 310 in such back-end director $200_1$-$200_4$.

As will be described, the message engine/CPU controller 310 passes CONTROL type information packets and the data pipe 380 passes DATA type information packets. Further, the CONTROL information packets and DATA information packets pass to and from the packet switching network 14 through end point controllers 16, as will be described in more detail in connection with FIG. 1. Likewise, the cache memory sections $220a$-$220n$ of the cache memory 220 are coupled to the packet switching network 14 through end point controllers, not shown.

The cache memory 220 is further described as containing both the encached user data and the information relating to the said data needed to manage and control the cache.

Further, as will be described, the packet switching network 14 transmits packets having two types of service requirement; a class 1 type and class 2 type. Here, Class 1 types are also referred to herein as CONTROL and include: (a) cache memory control reads/writes which pass from the directors to the cache memory for controlling various functions of the cache memory unrelated to the mere storage and retrieval of user data, e.g., maintaining and managing a history of what is in user cache memory, how long it has been there, and how recently it has been referenced (for the purposes of identifying candidate cache entries for writeback/replacement); communications areas (job queues, etc.) that allow the directors to exchange information, make requests of and service requests from other directors, etc.; and (b) messages which pass between directors through the message engine/CPU controller 310. Here, class 2 types, also referred to herein as DATA, include (a) user data passing from the director's data pipe to the cache memory; cache memory control reads/writes which pass from directors to the cache memory for enabling such memory to store the user data; and (b) messages which pass between directors through the data pipe 380. Thus, the messages between the directors may be either class 1 or class 2. In any event, class 1 has a lower latency requirement than class 2 and therefore class 1 types must pass through the network 14 faster than class 2 types. Further, these messages are assigned either class 1 or class 2 by the transmitting director and such designation is a function of the packet content set by the transmitting director and with the selection of the interface (message engine/CPU controller 310.

Figure 1:
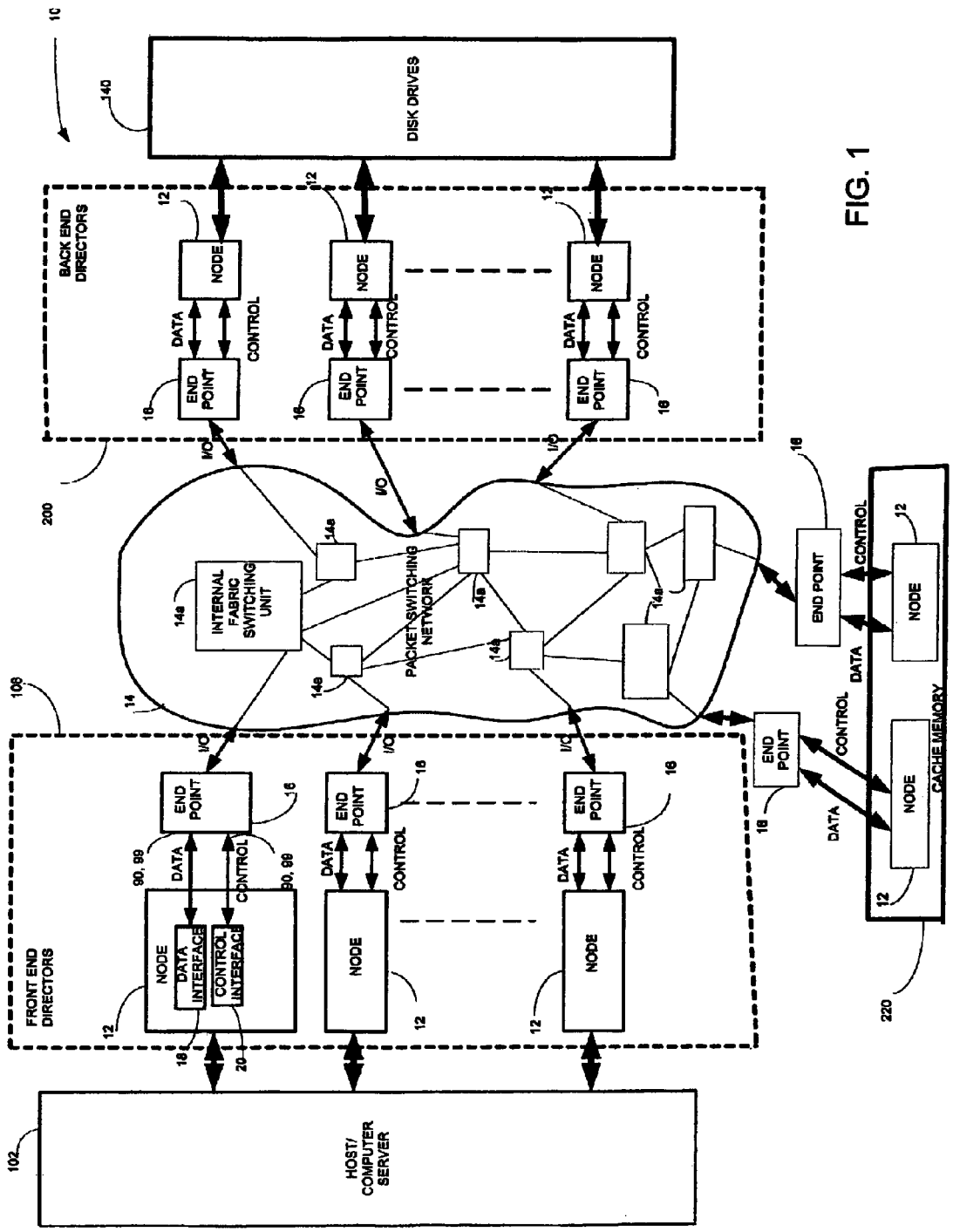
FIG. 1 is a diagram of a packet switching system according to the invention.

Referring now to FIG. 1, the packet switching system 10 is shown in more detail having a plurality of nodes 12, each one of the nodes 12 being coupled to the packet switching network 14 having a plurality of the interconnected fabric switching units 14a through a corresponding one of a plurality of end point controllers 16. In this embodiment, each one of the nodes 12 is adapted to transmit independently to the fabric switching network 14 two different types of information packets. Further, one portion of the end point controllers 16 is connected to the front end directors 108, a second portion is connected to the back end directors 200, and a third portion is connected to the cache memory 220.

Thus, one portion of the nodes 12 include the front end directors 108 and are sometimes referred to herein as front end director nodes, another portion of the nodes 12 include the back end directors 200 and are sometimes referred to herein as back end director nodes, and still another one portion of the nodes 12 include the cache memories 220 and are sometimes referred to herein as memory or cache memory nodes.

In addition, information packets and flow control packets also are transmitted between information packet controllers (i.e. fabric switching networks 14a or end points 16). Flow control packets do not have any priority value information, they have precedence over information packets, and they are only destined to the directly attached information packet controllers. In this description packets are assumed to refer to information packets unless otherwise explicitly denoted as flow control packets.

Here, one type of information packet is a Data information packet and the other type is a Control information packet. The director nodes 12 include a DATA interface 18 for transmitting and receiving the Data information packets and a CONTROL interface 20 for transmitting and receiving the Control information packets. Cache memory nodes 12 include similar DATA and CONTROL interfaces (not shown) for receiving and transmitting of Data and Control information request packets in support of cache memory references made by Directors.

As previously noted, the Control information packet type represents one class of quality of service, herein sometimes referred to as class 1, requiring a faster time (i.e. lower latency) through the packet switching system 10 than the Data information packet type, which represents a different class of service, herein sometimes referred to as class 2, achieving proper system performance with a slower time through the packet switching system 10. Thus, Control information packet types must pass through the system faster than Data Information packet types.

Thus, referring again to FIG. 1, as noted above, some end point controllers 16 connect to the nodes 12, one portion of the nodes 12 sometimes being referred to as front end Director nodes, another portion of the nodes 12 sometimes being referred to as to back end Director nodes, and still another portion of the nodes 12 sometimes being referred to as cache memory nodes. All three use the same end point controllers, and perform three basic functions:

Moving I/O user data to/from cache memory by means of transmitting DATA information packets (managed through data pipes 380 as described in the above referenced copending patent application Ser. No. 10/675,038 and copending patent application Ser. No. 09/540,828), Reading and writing cache control information from global cache memory by means of transmitting CONTROL information packets (managed from microprocessors 290 (FIG. 15), in the front and back end director nodes), and Direct communications of messages between director node microprocessors 290 by means of transmitting CONTROL information packets (managed by the microprocessors 290 or data pipes 380 in the front and back end director nodes).

All three are communicated over the same packet switching network 14 (FIG. 1). Cache control structure accesses are the low latency (class 1) type of packets, I/O user data is the latency insensitive (class 2) type of packets, and messaging among the directors is done either as class 1 or as class 2 depending on the urgency of delivery, class 1 message packets being issued through the Message Engine/CPU Controller 310, and class 2 message packets being issued through the data pipes 380.

Thus, while both information packet types traverse the same switching network 14, as noted above, each one of the nodes 12 is adapted to transmit independently to the packet switching network 14 the CONTROL information packets (i.e., class 1) and the DATA information packets (i.e., class 2). That is, the DATA interface 18 and the CONTROL interface 20 operate independently of one another. Thus, Data information passes to and from the DATA interface 18 via a bidirectional DATA bus and Control information passes to and from the CONTROL interface 20 via a bi-directional CONTROL bus.

Figure 2:
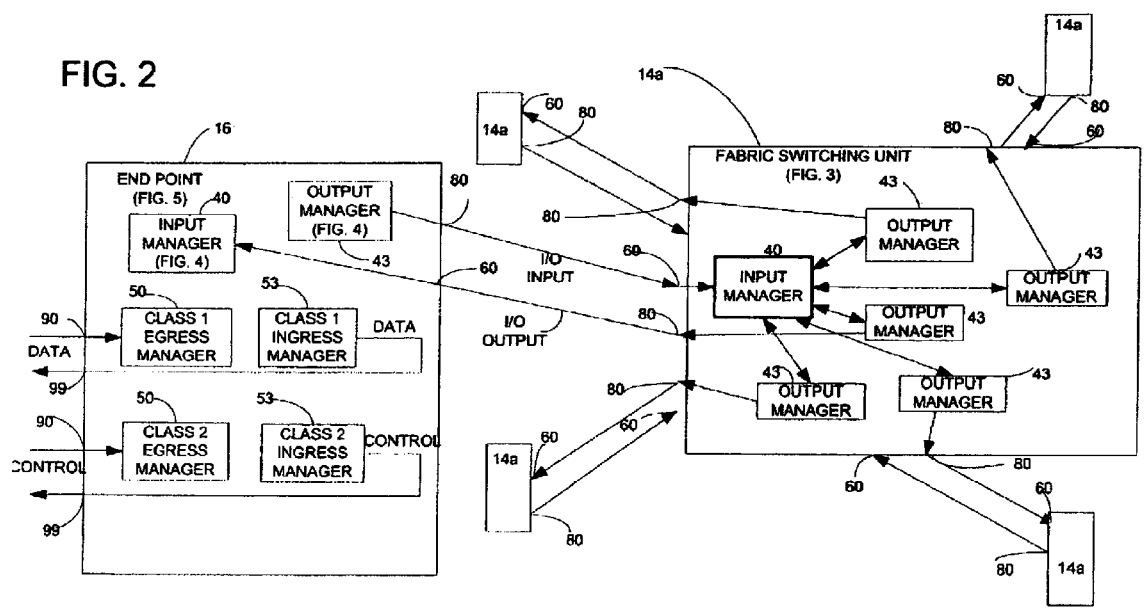
FIG. 2 is a block diagram of a pair of interconnected information packet controllers used in the system of FIG. 1, one being a fabric end point and the other being a fabric switching unit, such controllers having a packet flow manager therein for performing an arbitration for packet transmission order in accordance with the invention.

As noted above, each one of the end points 16 and fabric switching units 14a is referred to as an information packet controller. An exemplary end point 16 and packet switching unit 14a is shown in FIG. 2. It should be understood that the arbitration and packet flow control in each one of the end points 16 and switching units 14a operates under the same principles, and will be described in more detail below in connection with FIGS. 3 through 14 inclusive.

It is also noted that while each end point 16 typically will have one bidirectional I/O port (i.e., an input port 60 and an output port 80), each switching unit 14a typically has a plurality of bi-directional I/O ports (i.e., an input port 60 and an output port 80) only one of switching unit 14a I/O ports being described in detail herein.

The end point 16 and fabric switching unit 14a will be described in more detail in connection with FIGS. 5 and 6, and FIGS. 3 and 4, respectively.

It is first noted that both the fabric switching unit 14a and end point 16 include an Input Manager 40 and Output Manager 43. These managers are identical in configuration and exemplary ones thereof will be described in more detail in connection with FIG. 4. Suffice it to say here that Input Manager 40 of end point 16 is responsive to flow control packets from the fabric switching unit 14a coupled thereto. The Input Manager 40 supplies flow control signals to the Output Manager 43 coupled thereto.

The end point 16 also includes a class 1 Egress and class 2 Egress Managers 50 fed by Control information packets and Data information packets, respectively, from the CONTROL interface 20 and the DATA interface 18, respectively, of the node 12 coupled thereto.

The end point 16 also includes an Output Manager 43, to be described in more detail in connection with FIG. 4. Suffice it to say here that the Output Manager 43 issues flow control packets at port 80 of such end point 16.

The end point 16 also includes a class 1 Ingress and class 2 Ingress Managers 53 for coupling Control information packets and Data information packets, respectively, to the switching unit 14a coupled thereto. The interconnections between the Input Manager 40, Output Manager 43, Egress Managers 50 and Ingress Managers 53 will be described below in connection with FIG. 5.

Figure 3:
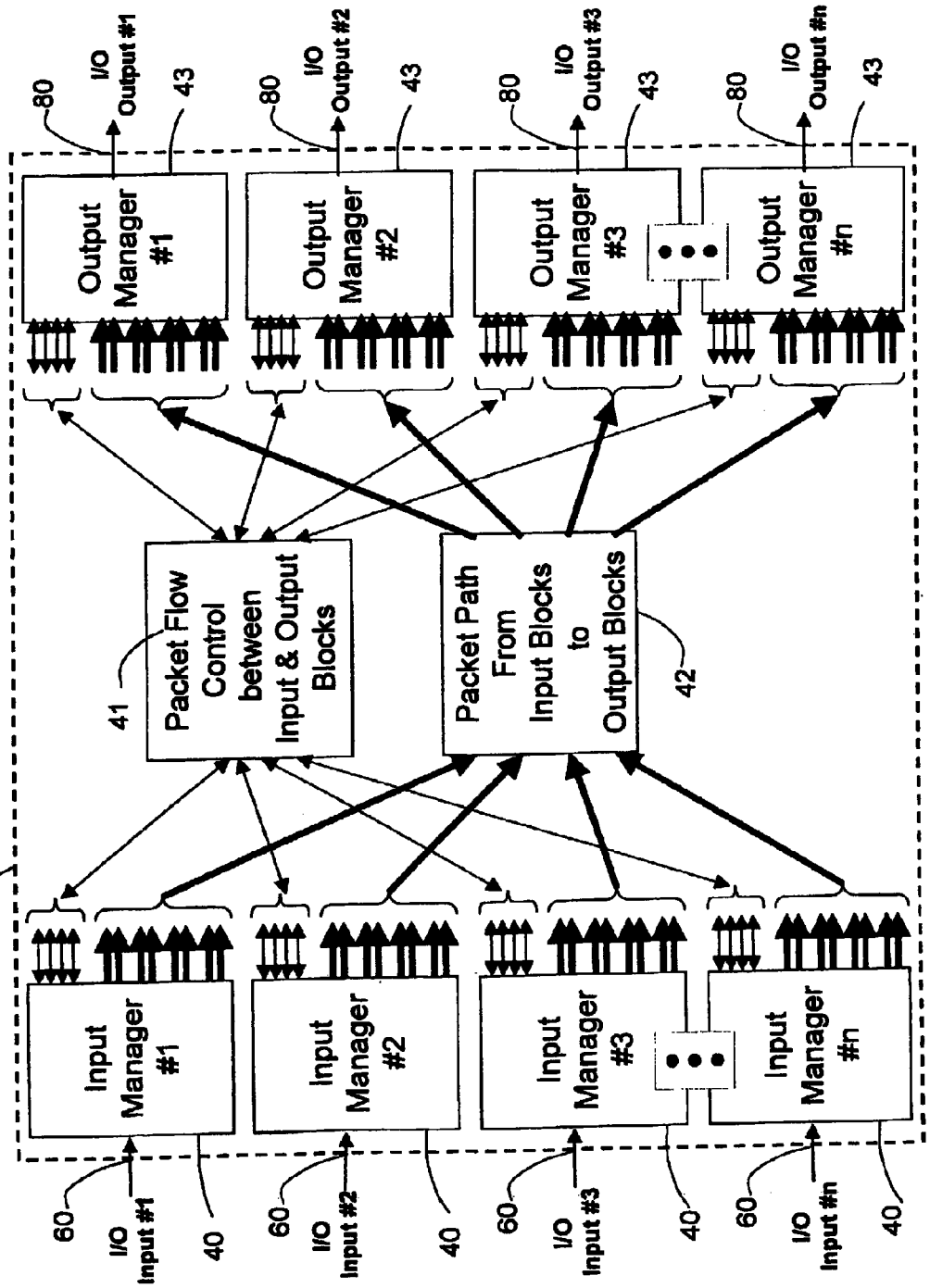
FIG. 3 is a block diagram of an exemplary one of the fabric switching units of FIG. 2.

Referring now to FIG. 3, the fabric switching unit 14a is shown to include a plurality of I/O busses. As noted above, each bus is comprised of a transmitter I/O Output Port 80 and an associated receiver I/O Input Port 60. Although for illustration purposes only one I/O Input port 60 is shown and two I/O Output Ports 80 are shown in FIG. 3, it is to be understood that the fabric switching unit 14a will have exactly one Input Port and one Output Port for each of the plurality of I/O busses connecting to other information packet controllers (FIG. 1). Each I/O Input Port 60 is controlled by an associated Input Manager 40. Similarly, each I/O Output Port 80 is controlled by an associated Output Manager 43.

In this embodiment, Data information packets and Control information packets are transmitted through the fabric switching unit 14a under control of the receiving port's Input Manager 40 in cooperation with the intended target I/O Output Manager 43, such information needed to route packets from input to output being provided in the packet content. Communications between Input Manager 40 and targeted Output Manager 43 is through a fully connected matrix of packet flow control Communication Paths 41. Under the coordinated control of the plurality of input Managers 40 and Output Managers 43, to be described in more detail in connection with FIG. 4, Data and Control information packets arriving at the plurality of inputs are transmitted through the fully connected Information Packet Path 42 matrix independently and in parallel as dictated by the availability each of the I/O Output ports 43.

Figure 4:
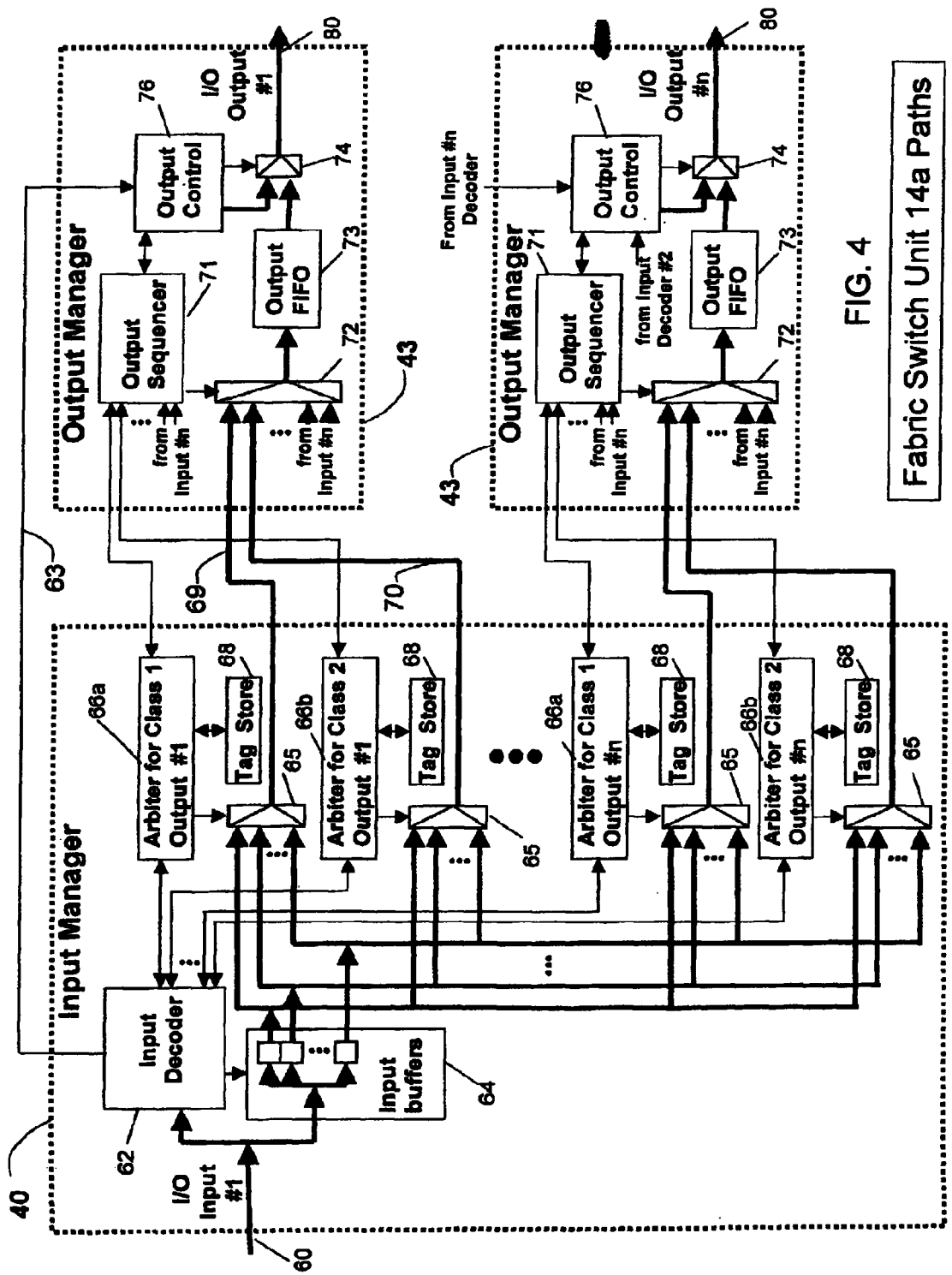
FIG. 4 is a block diagram of the exemplary one of the fabric switching units of FIG. 2, such diagram showing packet and internal communications paths within such fabric switching unit.

Referring now to FIG. 4, each of the I/O Input Managers 40 includes an input port Packet Decoder 62 which controls a set of Input Buffers 64, as well as a plurality of pairs of input Arbiters 66a, 66b. For each of the Output Managers 43, there is a separate pair of input Arbiters 66a, 66b, one for each of the different classes of quality of service. Thus, here arbiter 66a is for class 1 (i.e., Control information packets) and arbiter 66b is for class 2 (i.e., Data information packets)). Each one of the Arbiters 66a, 66b is responsible for selection of an information packet contained in the set of Input Buffers 64, i.e., the packet to be presented to the attached Output Manager 43. Each one of the Arbiter 66a, 66b has a dedicated Tag Store 68 which contains a list of information packets from which it selects. Each Arbiter 66a, 66b controls a multiplexer 65 to provide a path for the selected packet to the attached Output Manager 43.

It is noted that there is a plurality of I/O Output Managers 43, each including an I/O Output Control 76 to control the issuance of information packets and flow control packets onto the I/O Output Port 80. Each I/O Output Manager 43 includes an Output Sequencer 71 to determine the order of issue of the packets being presented by the attached Arbiters 66a, 66b. The Sequencer 71 works in conjunction with an Arbiter 66a, 66b to transfer a selected packet from an entry in the Input Buffers 64, through the Arbiter's multiplexer 65, through the Sequencer's multiplexer 72 and into the Output FIFO 73.

It should be noted that for each of the pair of associated I/O Input and I/O Output ports comprising one I/O bus, there is a direct communication path 63, connecting the Input Decoder 62 and the Output Control 76 such that the Input Decoder 62 can issue requests to the Output Control 76 for the creation and transmission of I/O bus level flow control packets. These packets will be interjected between information packets being transmitted on the I/O Output Port 80. This injection of flow control packets in the stream of information packets is supported by the inclusion of the information packet Output FIFO 73.

It should be noted that for each I/O Output Manager 43 there are Information Packet Paths 69, 70 for information packets from the Input I/O Manager 40 associated with that I/O bus. While this path is not necessary for the correct operation of the fabric switching unit, it provides a convenient ability to loop back packets to the sender for test purposes.

The Input Decoder 62 is responsible for interrogating incoming packets from the I/O Input Port 60. It initially identifies them as either flow control packets or information packets. Flow control packets are forwarded to the Output Control 76 of the associated I/O Output Port 80 via the aforementioned direct communication path 63. Packets identified by the Input Decoder 62 as information packets are first examined to find if there is an available buffer entry in the Input Buffers 64, as determined by a comparison of the packet priority with the number of available credits as previously described. In the event that the Input Decoder 62 determines that there is insufficient space for the information packet, the Input Decoder 62 notifies the associated I/O Port Output Control 76 via the direct communication path 63 to create and issue a Retry flow control packet on the I/O Output Port 80. If there is sufficient buffer space, the Input Decoder 62 selects an available buffer entry in the Input Buffers 64 and places the information packet in the buffer. The Input Decoder 62 then informs the associated Output Control 76 to create and issue a packet acknowledge flow control packet on the I/O Output Port 80.

Upon a successful receipt and storage of the information packet, the Input Decoder 62 then, having identified the packet's targeted I/O Output Manager 43 and quality of service as indicated in the packet content, notifies the appropriate one of the Arbiters 66a, 66b connected to the targeted Output Manager 43 of the availability of the packet for selection. It should be noted that to achieve minimum latency in transmission of a packets from Input Port 60 to Output Port 80, that the Input Decoder may notify the Arbiter 66a, 66b of the availability of the packet prior to the packet being completely stored in the Input Buffers 64. Similarly, the Sequencer 71 and Output Control 76 may initiate packet transmission on the Output Port 80 prior to the arrival of the complete packet.

As previously noted, the Arbiter 66a, 66b is responsible for the selection of a packet stored in the Input Buffers 64 for presentation to the attached Output Manager 43. To this end the Arbiter 66a, 66b maintains a list of the available packets for selection, which resides in the Tag Store 68. The Arbiter 66a, 66b makes the selection based on the list content and information it receives from the Sequencer 71. In this embodiment, the Tag Store list entries consist of:

a) Time of arrival of the packet,
b) Packet priority (derived from packet content),
c) Location of packet in Input Buffers 64, and
d) Status (invalid, valid awaiting transfer, or transferred awaiting acknowledge)

As previously noted, the Arbiter 66a, 66b also bases its selection on information it receives from the Sequencer 71. This information specifies the lowest priority packet that can be expected to be accepted by the information packet controller connected to that Output Port 80. This is herein referred to as the threshold value. Each Sequencer 71 generates a separate threshold value and communicates that value to all of the Arbiters 66a, 66b it connects to. This threshold value can be calculated from information supplied in the form of credits from initiator based flow control information, or can be calculated by the Sequencer 71 in the event that the attached information packet controller is operating in receiver based flow control mode using retry packets.

While in some embodiments the quality of service is presented directly in the packet content, in this embodiment the quality of service is embedded in and implied by the packet priority, understood by convention. It is noted that in this example there are four priorities, the lowest priority is 0 and the highest 3. Further, here CONTROL information request packets are assigned a priority 2 and CONTROL information response packets are assigned a priority of 3 while DATA information request packets are assigned a priority of 0 and DATA information response packets are assigned a priority of 1.

Figure 7:
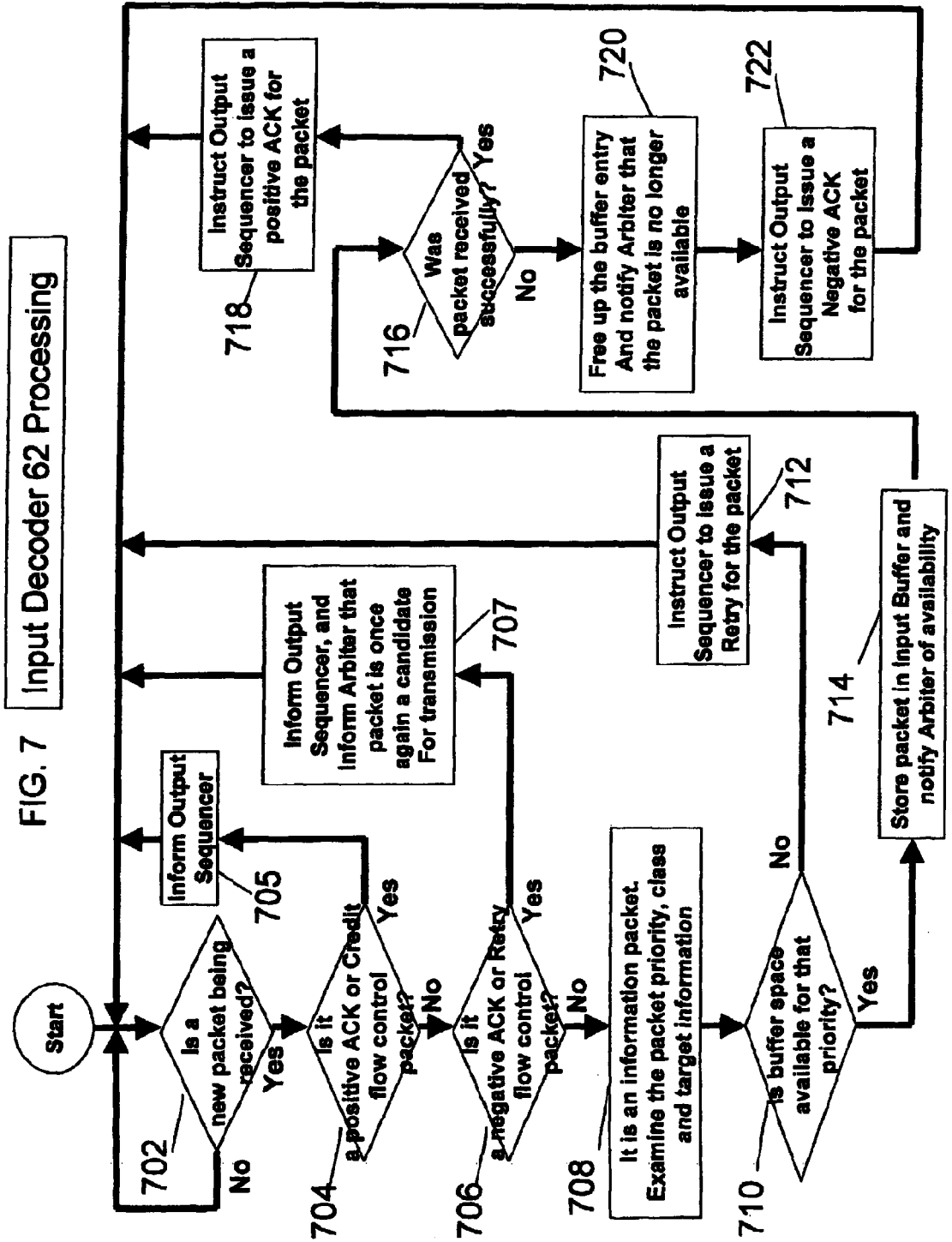
FIG. 7 is a flow diagram of the process used by input port managers of information packet controllers of FIG. 2 to decode and parse incoming packets.

Referring now to FIG. 7, the Input Decoder 62 awaits the arrival of information and flow control packets on the I/O Input Port 60, STEP 702. Upon a packet being received, the Input Decoder 62 examines the packet to determine if it is a flow control packet indicating positive ACK or Credit, STEP 704. If the packet being received is one of the said flow control packet types, the Input Decoder 62 will inform the associated Output Control 76 via the dedicated communication path 63 of the flow control packet content, STEP 705. This information is communicated to and used by the Output Sequencer 71 to calculate the threshold value, to be described in connection with FIGS. 9 and 10. Suffice it to say here that if the packet being received is one of either a negative acknowledge or Retry flow control packet types, STEP 706, the Input Decoder 62 will, in addition to informing inform the associated Output Control 76 via the dedicated communication path 63 of the flow control packet content, also inform the appropriate Arbiter 66a, 66b that the packet is a candidate for retransmission, STEP 707. If in STEP 704 and STEP 706 the packet is not identified as a flow control packet, then since it is an information packet, the Input Decoder 62 proceeds to examine the priority of the packet, quality of service class of the packet, and based on the target information contained within the packet and a predefined knowledge of the network topology, identifies the appropriate Arbiter 66a, 66b responsible for transmission, STEP 708.

The Input Decoder 62 then proceeds to ascertain if there is sufficient buffer space available in the Input Buffers 64, in compliance with the aforementioned buffer allocation by priority, STEP 710. If there are insufficient buffer entries, the Input Decoder 62 instructs the Output Control 76 to issue a retry for the packet being received, STEP 712. If buffer space is available for that priority packet, the Input Decoder 62 stores the packet in the Input Buffers 64, and informs the identified Arbiter 66a, 66b of the packet availability and attributes, STEP 714. The Input Decoder 62 determines if the packet was received in its entirety error free, STEP 716. If it was received successfully, the Input Decoder 62 instructs the Output Control 76 to issue a positive acknowledge for the packet, STEP 718. If there was an error in packet receipt, the Input Decoder 62 frees up the buffer entry and notifies the identified Arbiter that the packet is not valid and not available for transmission, Step 720. The Input Decoder 62 proceeds to instruct the associated Output Control 76 to issue a negative acknowledge for the packet, STEP 722. The Input Decoder returns to waiting for the next packet, STEP 702.

Figure 8:
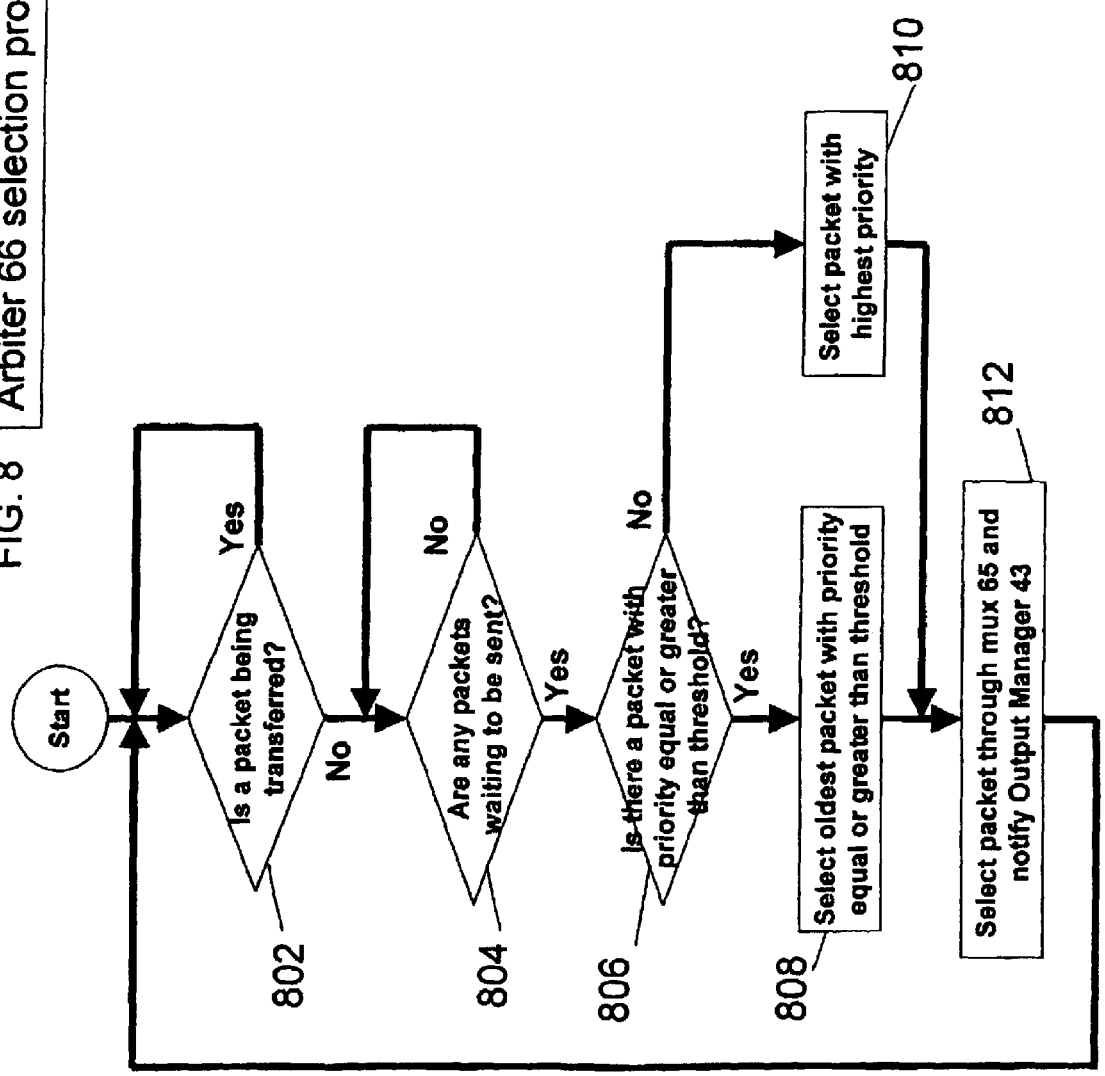
FIG. 8 is a flow diagram of the process used by input port managers within the information packet controllers of FIG. 2 to select candidate packets to be presented to targeted output port managers.

FIG. 8 denotes the method employed by the Arbiter 66a, 66b to select a packet for presentation to the Output Manager 43. No changes are made to packet selection if a packet has already been presented and is in the process of being transferred, STEP 802. When no packet is being transferred, the Arbiter 66a, 66b determines if there are one or more packets waiting for transmission as indicated by the packet list in the Tag Store 68, STEP 804. If there are no packets waiting to be transmitted, the Arbiter 66a, 66b will wait for the Input Decoder 62 to inform the Arbiter 66a, 66b of the availability of a packet. If there are one or more packets waiting, the Arbiter 66a, 66b determines if any of the candidate packets have an associated priority attribute equal to or greater than the current threshold provided by the Output Sequencer 71, STEP 806. If there are no packets that meet this criteria the Arbiter 66a, 66b selects the oldest one of the highest priority packets available, that being the packet that is most likely to be accepted by the information packet controller connected to the Output Port 80, STEP 810. If there is one or more packets that meet the threshold criteria, the Arbiter 66a, 66b will select the oldest packet with priority equal to or greater than the threshold value, Once the appropriate packet has been selected, the Arbiter 66a, 66b determines the location of the packet within the input Buffers 64 as described from the packet attributes in the Tag Store 68. Using this location information, the Arbiter 66a, 66b makes the appropriate selection of the multiplexer 65, and notifies the Output Sequencer 71 of the availability of the packet, STEP 812. It should be noted that the relevant information contained in the Tag Store 68 is communicated to the Output Sequencer 71 to aid in the final selection of the next packet to be transmitted on the I/O Output Port 80. The packet may or may not be transferred at the discretion of the Output Sequencer 71.

As described earlier, the Output Manager 43, and more specifically the contained Output Sequencer 71, calculates the threshold value for that I/O Output Port 80. Dependent on whether the Output Port 80 is operating in an initiator or target flow, control, the Output Sequencer 71 will employ one of two different methods to calculate the threshold value.

Figure 9:
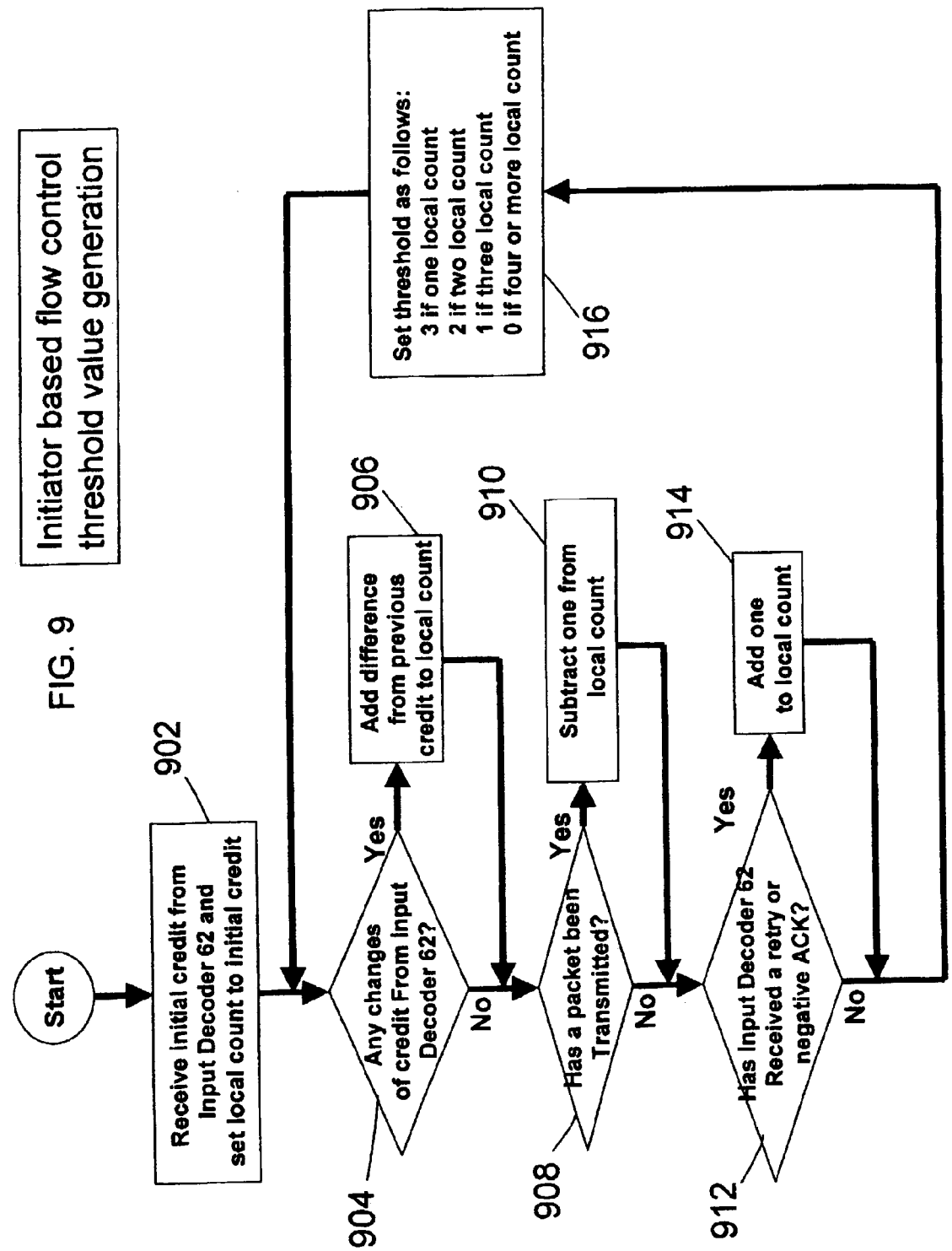
FIG. 9 is a flow diagram of the process used by the input port managers within the information packet controllers of FIG. 2 to prioritize packets for transmission in accordance with the invention.

Referring now to FIG. 9, when the attached information packet controller is operating in initiator based flow control, an initial buffer credit is communicated by the information packet controller connected to the I/O Output Port 80. This initial buffer credit is received by the associated I/O Input Port 60, and communicated to the Output Sequencer 71 via the dedicated communication path 63. The Output Sequencer 71 uses this initial buffer credit to calculate a local buffer count, STEP 902. This initial buffer count represents the maximum number of packet buffers the attached information packet controller has available. The Output Sequencer 71 will monitor the flow control information presented by the Input Decoder 62, and the packet transmission information provided by the Output Control 76 to adjust the local count, STEPS 904, 908 and 912. It should be noted that the local count represents the actual number of available packet buffers after having taken into consideration packets that have been transmitted but not yet accounted for via an update of the buffer credit from the attached information packet controller. Notification of changes of credit from Input Decoder 62, STEP 904, represent buffers previously consumed that have been freed up by the attached information packet controller. The local count is updated based on this information, STEP 906. Packets transferred prior to a credit update, STEP 908, decrement the local count, STEP 910. Packets that are rejected by the attached information packet controller, as notified by the Input Decoder 62, STEP 912, by implication free up free up buffers, and the local count is adjusted accordingly, STEP 914. Each time the local count changes, the threshold value must be recalculated. To ensure forward progress of transmission of packets through the network and hence avoid deadlock, an information packet can only be accepted by an information packet controller if there is at least one buffer available for a higher priority packet unless the packet being transmitted is of the highest priority. In this embodiment only one buffer entry is reserved for each higher priority above priority 0, so the threshold is calculated as follows, STEP 916:

| Local Count: | Priority Threshold Value: |
|---|---|
| 1 | 3 |
| 2 | 2 |
| 3 | 1 |
| 4 or more | 0 |

It should be noted that the threshold is continuously being evaluated for update, and there is no implied passage of time between STEPS.

Figure 10:
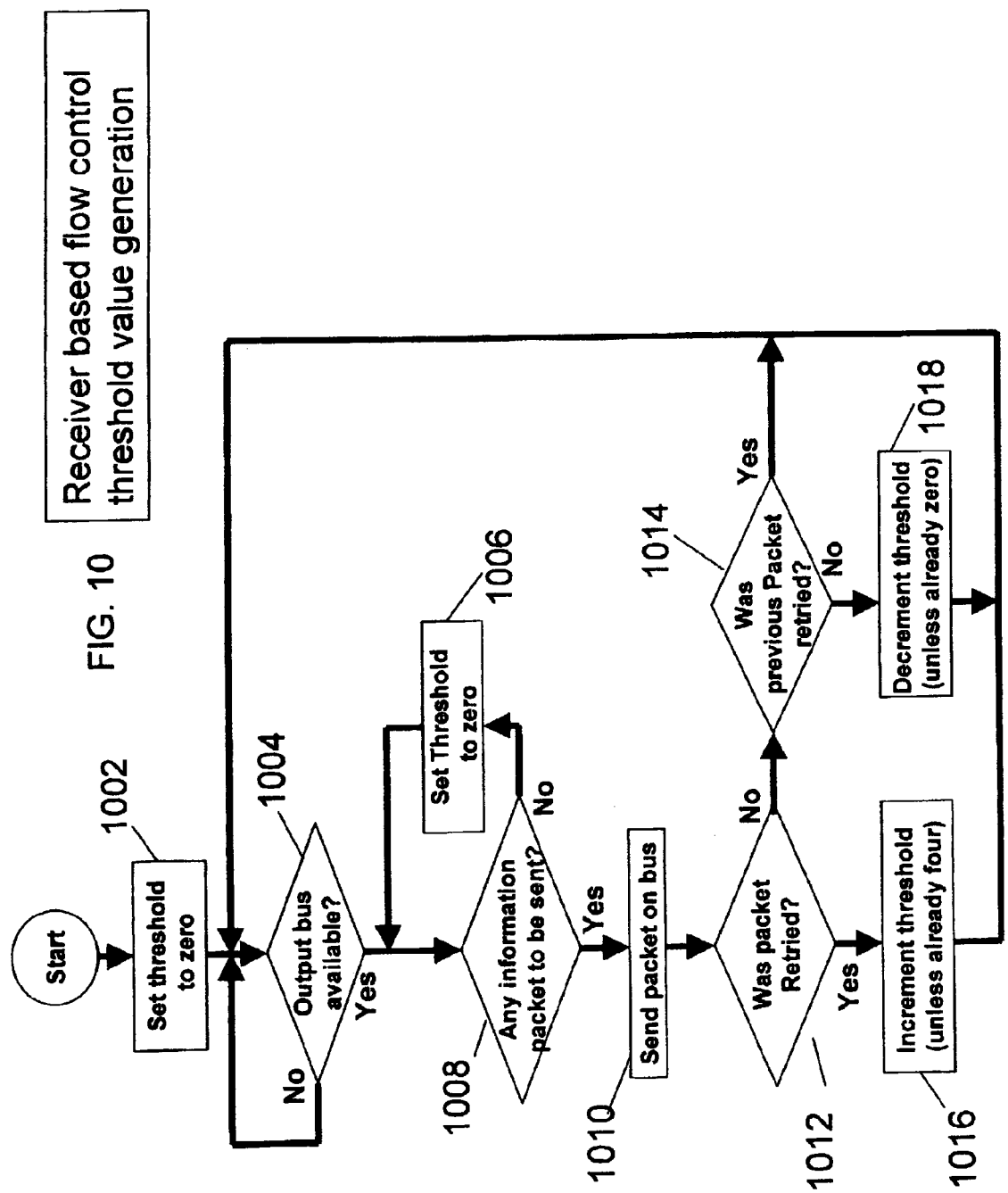
FIG. 10 is a flow diagram of the process used by input port managers within the information packet controllers of FIG. 2 to prioritize packets for transmission in accordance with the invention.

When the attached information packet controller is operating in target flow control mode, the threshold value must be inferred from the packet retry behavior of the attached information packet controller. Referring now to FIG. 10, the target is assumed to be initially capable of accepting any priority packet, STEP 1002. While the Output Port 80 is in use transferring an information or flow control packet, no changes are made to the calculated threshold value, STEP 1004. If the Output Port 80 is not currently transmitting information or flow control packets, but there is no packet available for transmission, the threshold value will be reinitialized to 0, allowing the next available packet, irrespective of priority, to be opportunistically transmitted to the attached information packet controller, STEP 1006. Once a packet is available and has been transmitted, STEP 1010, the Sequencer 71 notes the response from the attached information packet controller, as communicated by the Input Decoder 62. If the packet has been retried, STEP 1012, the attached information packet controller is assumed to have insufficient buffer space for that priority packet, and the threshold value, assuming it is not already at the maximum value, is incremented, STEP 1016. If the packet was accepted by the information packet controller, there is that potential that the attached information packet controller has freed up sufficient buffer space to also accept lower priority packets, and that the assumed threshold value may be higher than necessary. The likelihood that this condition does exist increases with the number of consecutive packets accepted, hence in this embodiment the Sequencer 71 determines if the previously transmitted packet was retried, STEP 1014. If it was, no adjustment is made to the threshold value, If there is evidence of consecutive packets being accepted, STEP 1014, the threshold value is decremented unless already at the lowest value, STEP 1018.

It should be noted that if there is at least one packet available, the Arbiter 66a, 66b always presents a packet to the Output Sequencer 71, even if said packet does not meet the priority threshold value criterion. Transmission of packets that do not meet the threshold criterion is necessary for receiver based flow control, and optional for initiator based flow control.

Figure 11:
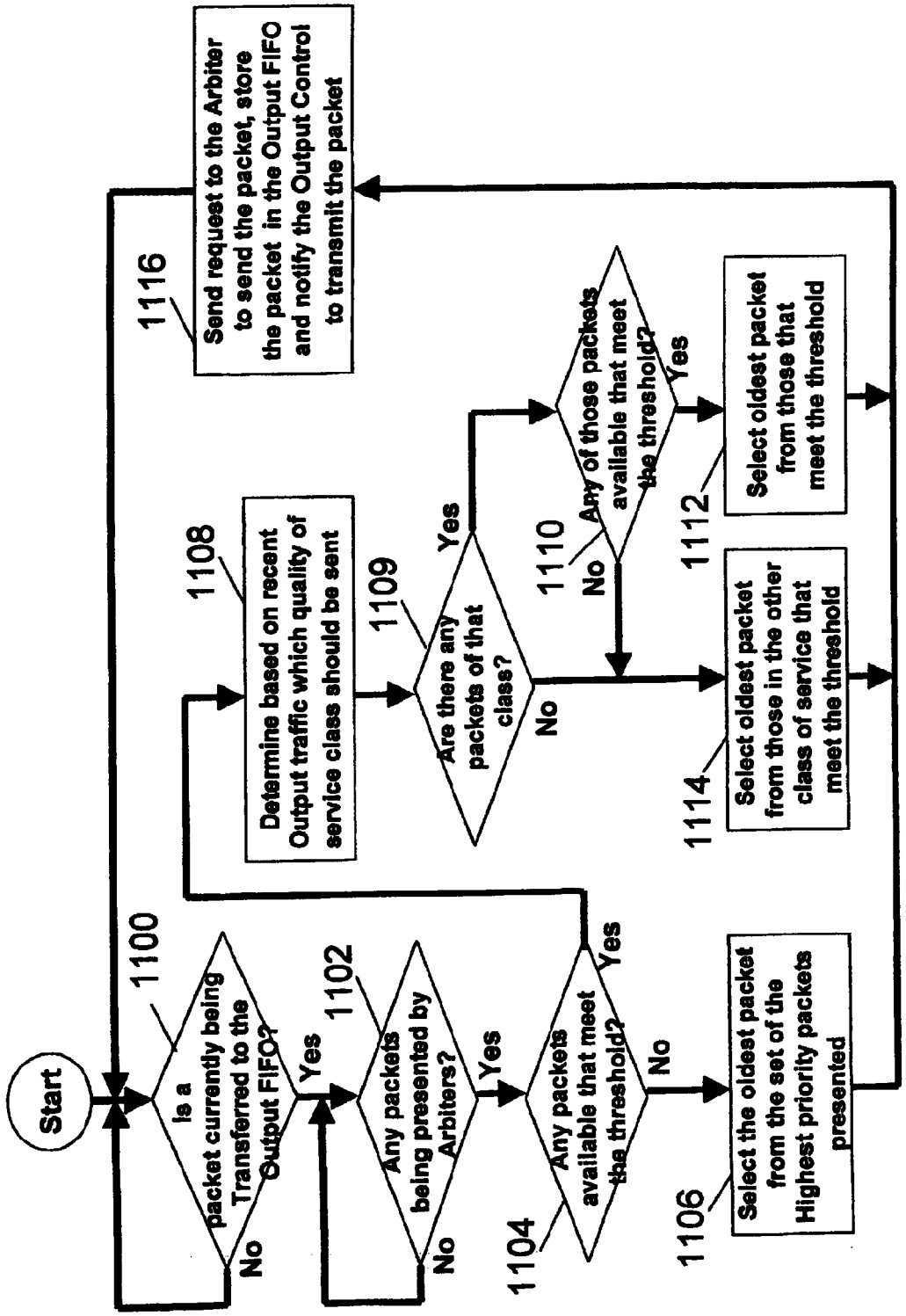
FIG. 11 is a flow diagram of the process used by output port managers of information packet controllers FIG. 2 to select the order for packet transmission for packets presented by the plurality of input port managers.

FIG. 11 shows the selection process employed by the Output Sequencer 71 to choose the next information packet to be transmitted to the I/O Output Port 80 from the packets presented by the plurality of pairs of Arbiters 66a, 66b. While there is a packet in transition from the Input Buffers 64 to the Output FIFO 73, the next packet is not selected, STEP 1100. When there are no packets being transferred to the Output FIFO 73, or at the completion of a packet transfer, the Output Sequencer 71 checks if one or more subsequent packets are available for transfer, STEP 1102. If no packets are being presented, the Output Sequencer 71 will monitor Arbiter 66a, 66b communications awaiting the arrival of new packets. When one or more packets are presented, the Output Sequencer 71 determines if any of the presented packets meet the threshold criteria, STEP 1104. If not, the Output Sequencer 71 will select the oldest packet from the subset of available packets having the highest priority value, STEP 1106. If on the other hand there are available packets that meet the threshold criteria, the Output Sequencer 71 will proceed to determine, based on an explicit understanding of the requirements of the quality of service classes coupled with the selection history of previous transmitted packets from that I/O Output Port 80, the appropriate packet class that should be transmitted next, STEP 1108. In this embodiment, class 1 packets are understood to have low latency attributes, this being the primary consideration. Thus class 1 packets meeting the threshold criteria will always be selected before any class 2 packets. The Output Sequencer 71, once it has determined the appropriate quality of service class that should be transmitted next, will check if there are any packets presented of that class, STEP 1109. If not, the Output Sequencer 71 will proceed to select the oldest packet from those in the other class that meets the threshold criteria, STEP 1114. If it is determined in STEP 1109 that there are indeed packets of the desired class, the Output Sequencer 71 determines if any of those packets meet the threshold criteria, STEP 1110. If there is one or more packets of that class that meet the criteria, the Output Sequencer 71 will select the oldest of those packets, STEP 1112. If none of the packets of that class meet the criteria, then the oldest packet from those presented of the other class that meet the threshold criteria is selected, STEP 1114. Once the next packet to be transferred has been chosen, the Output Sequencer 71 will select the appropriate path through the Output Multiplexer 72, STEP 1115. After the packet selection process is complete, the Output Sequencer 71 requests of the Arbiter 66a, 66b presenting the selected packet to send the packet, stores said packet in the Output FIFO 73, and notifies the Output Control 76 that the packet is ready for transmission, STEP 1116. The Output Sequencer then proceeds to start the selection process for the next packet for transmission, returning to Step 1110.

Figure 12:
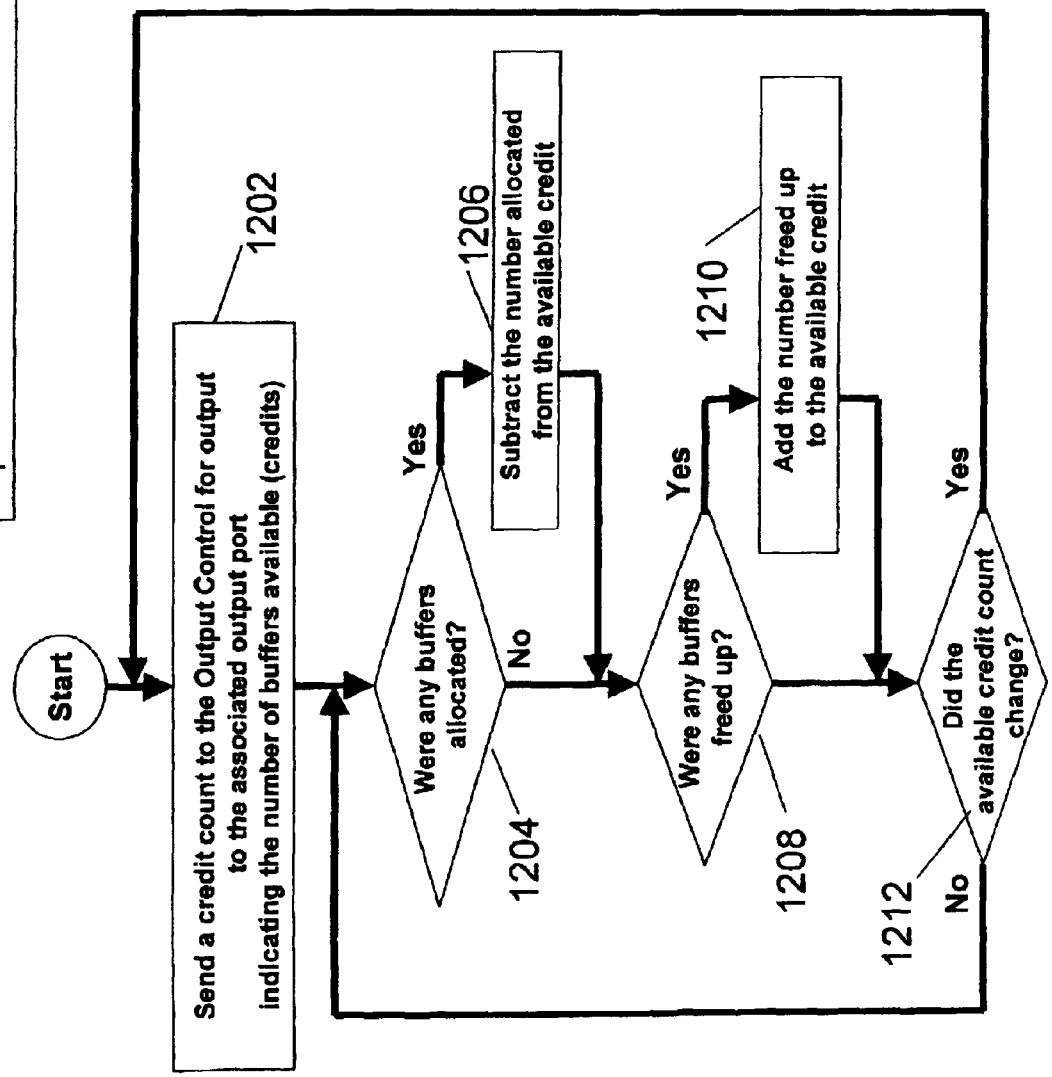
FIG. 12 is a flow diagram of the process used to control transmission of packets into the input port manager of information packet controllers of FIG. 2 in accordance with the invention.

Referring now to FIG. 12, the input flow control is managed by the Input Decoder 62. The Input Decoder 62 sends a credit count to the associated Output Control 76 via the dedicated communication path 63, STEP 1202. If the attached information packet controller is operating in initiator flow control mode, the credit count will be transmitted as a credit flow control packet. If the attached information packet controller is operating in target flow control mode, the Output Control 76 does not act on this information; rather it relies on the Input Decoder 62 to issue Retry commands to the Output Control 76 in support of buffer availability flow control. Once the current credit value has been established, STEP 1202, the Input Decoder 62 will note the buffer entry usage to determine changes in the number of buffers available, STEPS 1204 and 1208. Buffers that are newly allocated, STEP 1204 will result in a reduction of the available credit, STEP 1206, while buffers that are no longer in use, i.e. freed up, will result in an increase of available credit, STEP 1210. Determination of net change in the credit count, STEP 1212, will result in the issuance of a credit count update to the Output Control 76, STEP 1202.

Figure 5:
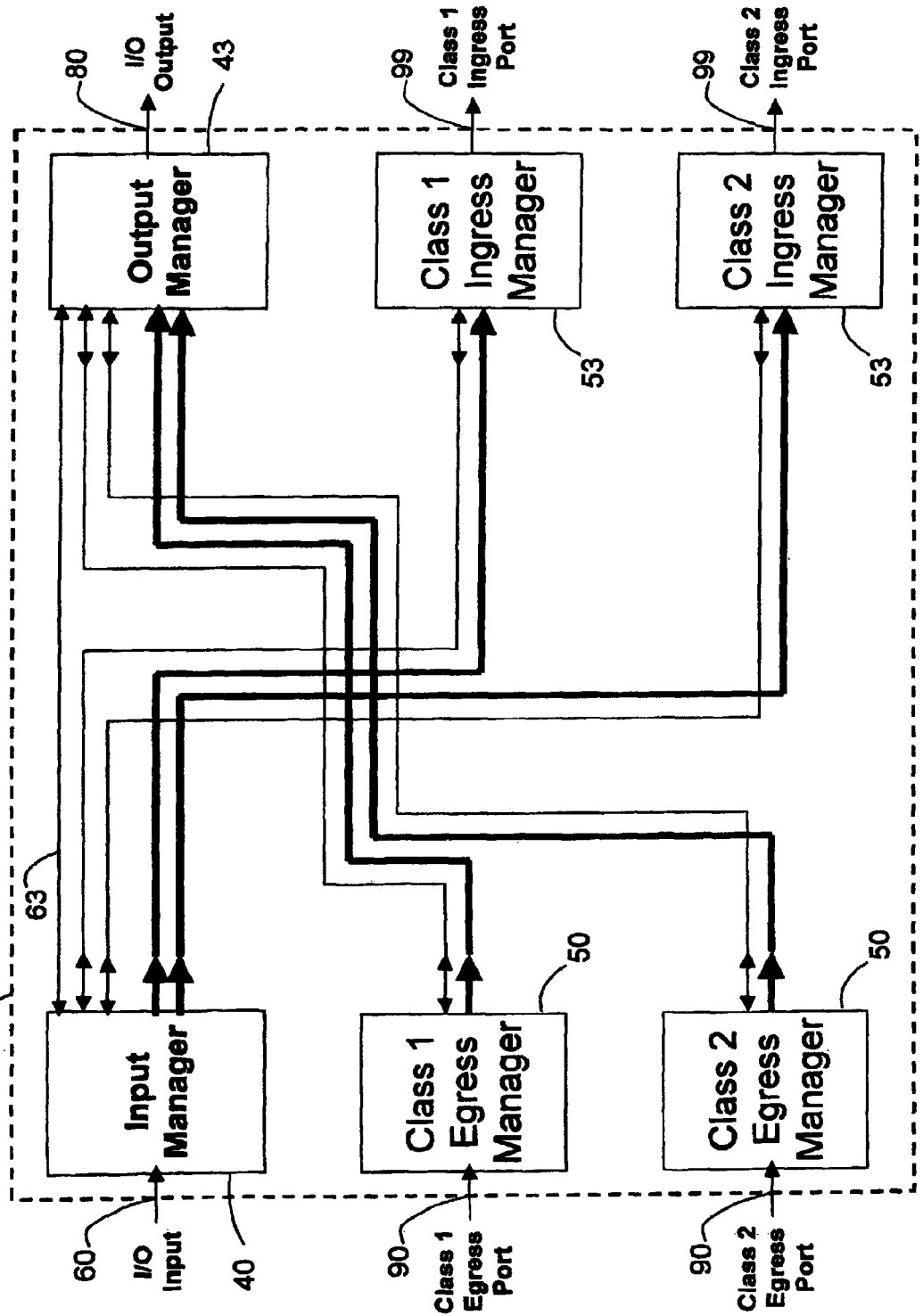
FIG. 5 is a block diagram of an exemplary one of the fabric end points of FIG. 2.

Referring now to FIG. 5, the fabric end point 16 includes, as noted above, components in common with the fabric switch unit, specifically the Input Manager 40 and the Output Manager 43 in support of the fabric I/O attach input and output port. The fabric end point 16 also includes components dedicated to interface to the fabric nodes 12, specifically the Egress Managers 50 and the Ingress Managers 53. Egress Managers control the transmission of packets from the fabric nodes 12 into the packet switching network 14, while Ingress Managers control the receipt of packets from the fabric to the fabric nodes 12.

More particularly, the Input Manager 40 of end point 16 has an I/O port 60 connected to the I/O port 80 of a switching unit 14a, as shown in FIG. 2. The class 1 Egress Manager 50 has a class 1 egress port connected to the CONTROL INTERFACE 20 of node 12, as shown in FIGS. 1 and 2 at port 90. The class 2 Egress Manager 50 has a class 2 egress port connected to the DATA INTERFACE 18 of node 12, as shown in FIGS. 1 and 2 at port 90. The Output Manager 43 is fed by Control and Data packets from the class 1 and class 2 Egress Managers 50, respectively, as shown in FIG. 5. The Output Manager 43 of the end point 16 is connected to I/O port 80 of the end point 16 and is connected to the I/O port 60 of switching unit 14a, as shown in FIG. 4. Class 1 and class 2 Ingress Managers 53 are fed signals and packets from the Input Manager 40 and provide Control and Data packets at port 99, FIG. 2.

Figure 6:
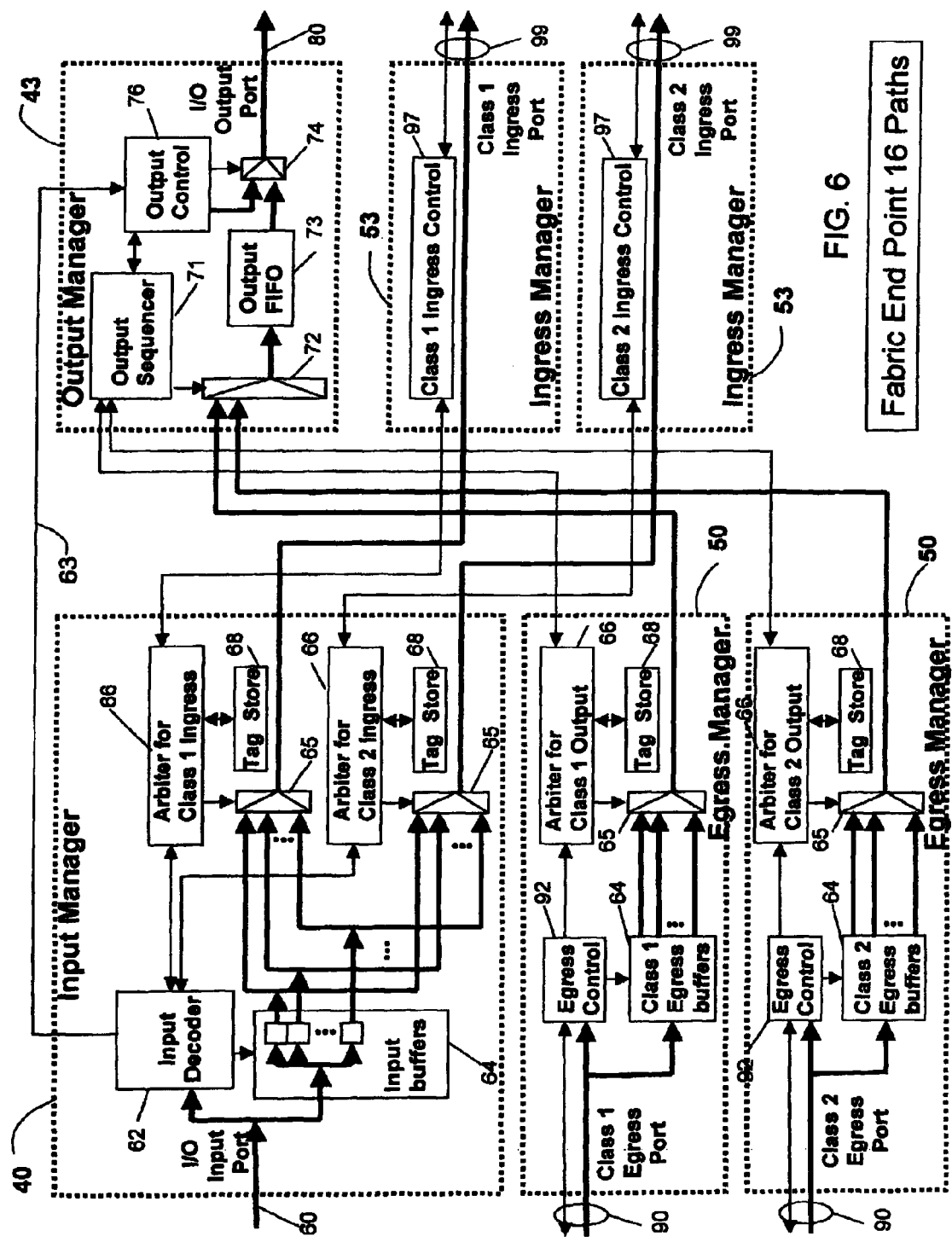
FIG. 6 is a block diagram of the exemplary one of the fabric end points of FIG. 5, such diagram showing packet and internal communications paths within said end point.

Referring now to FIG. 6, the fabric end point 16 is shown in more detail. It is noted that the Egress Manager 50 includes an Egress Control 92, which performs a similar but slightly different function than the fabric switch unit's Input Decoder 62. The Egress Control 92 controls an Egress Buffer 64 which provides the same functions as the fabric switch unit Input Buffers 64. There is a pair of attached Arbiters 66a, 66b that perform in like manner to the Arbiter 66a, 66b contained in the fabric switch unit 14a, as does the Tag Store 68.

Figure 13:
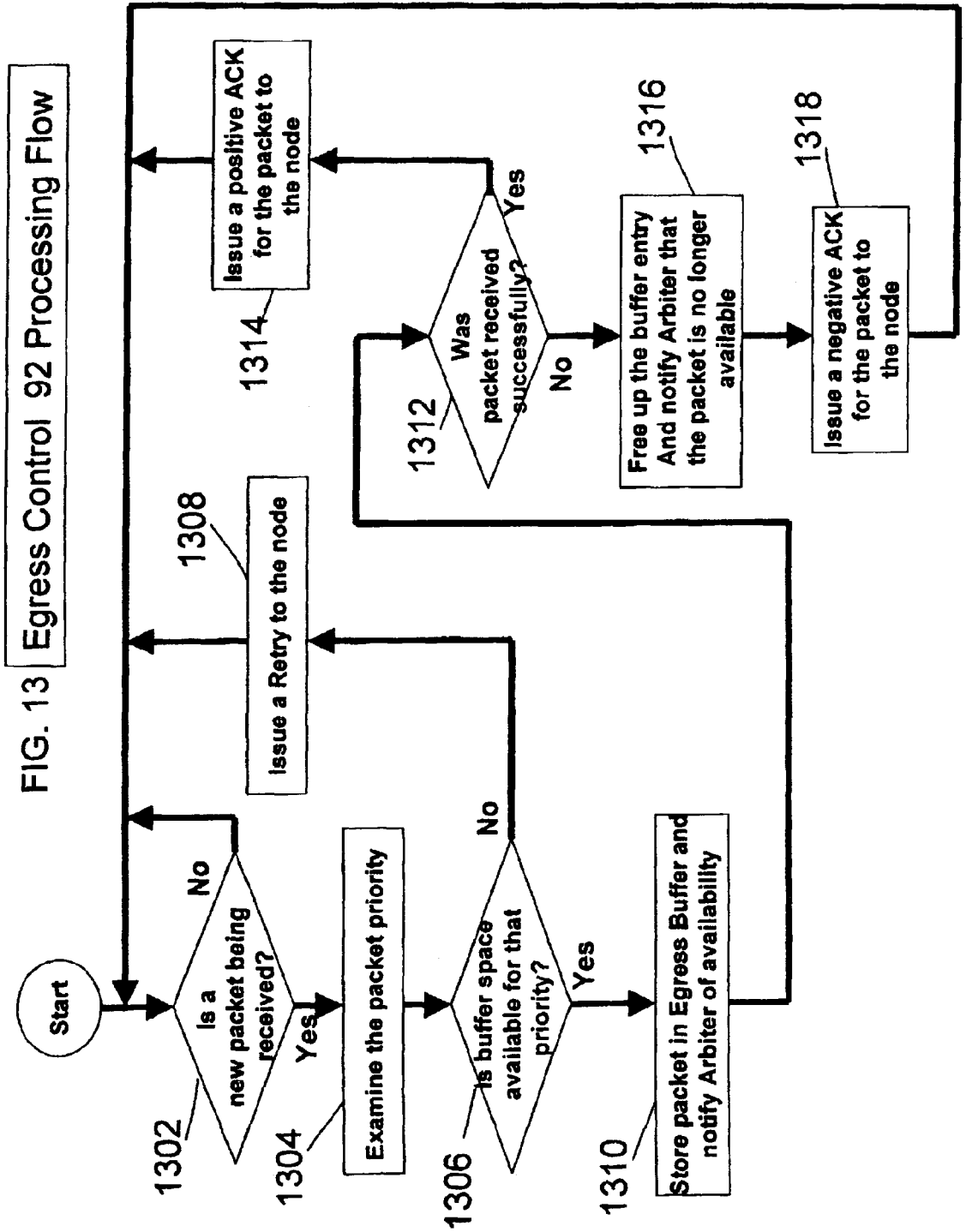
FIG. 13 is a flow diagram of the process of controlling the transmission of packets into the end points of the network from nodes of FIG. 2 in accordance with the invention.

Referring now to FIG. 13, the Egress Control 92 awaits the arrival of information and flow control packets on the node Egress Port 90, STEP 1302. Upon a packet being received, the Egress Control 92 examines the packet to determine the priority, STEP 1304. The Egress Control 92 then proceeds to ascertain if there is sufficient buffer space available in the Egress Buffers 64, in compliance with the aforementioned buffer allocation by priority, STEP 1306. If there are insufficient buffer entries, the Egress Control 92 notifies the node that the packet was not accepted by issuing a Retry, STEP 1308. If buffer space is available for that priority packet, the Egress Control 92 stores the packet in the Input Buffers 64 and informs the attached Arbiter 66a, 66b of the packet availability and attributes, STEP 1310. The Egress Control 92 determines if the packet was received in its entirety error free, STEP 1312. If it was received successfully, the Egress Control 92 instructs the node that the packet was accepted via a positive acknowledge for the packet, STEP 1314. If there was an error in packet receipt, the Egress Control 92 frees up the buffer entry and notifies the identified Arbiter that the packet is not valid and not available for transmission, Step 1316. The Egress Control 92 proceeds to instruct the node that the packet was not successfully transmitted via a negative acknowledge for the packet, STEP 1318. The Egress Control 92 returns to waiting for the next packet, STEP 1302.

Figure 14:
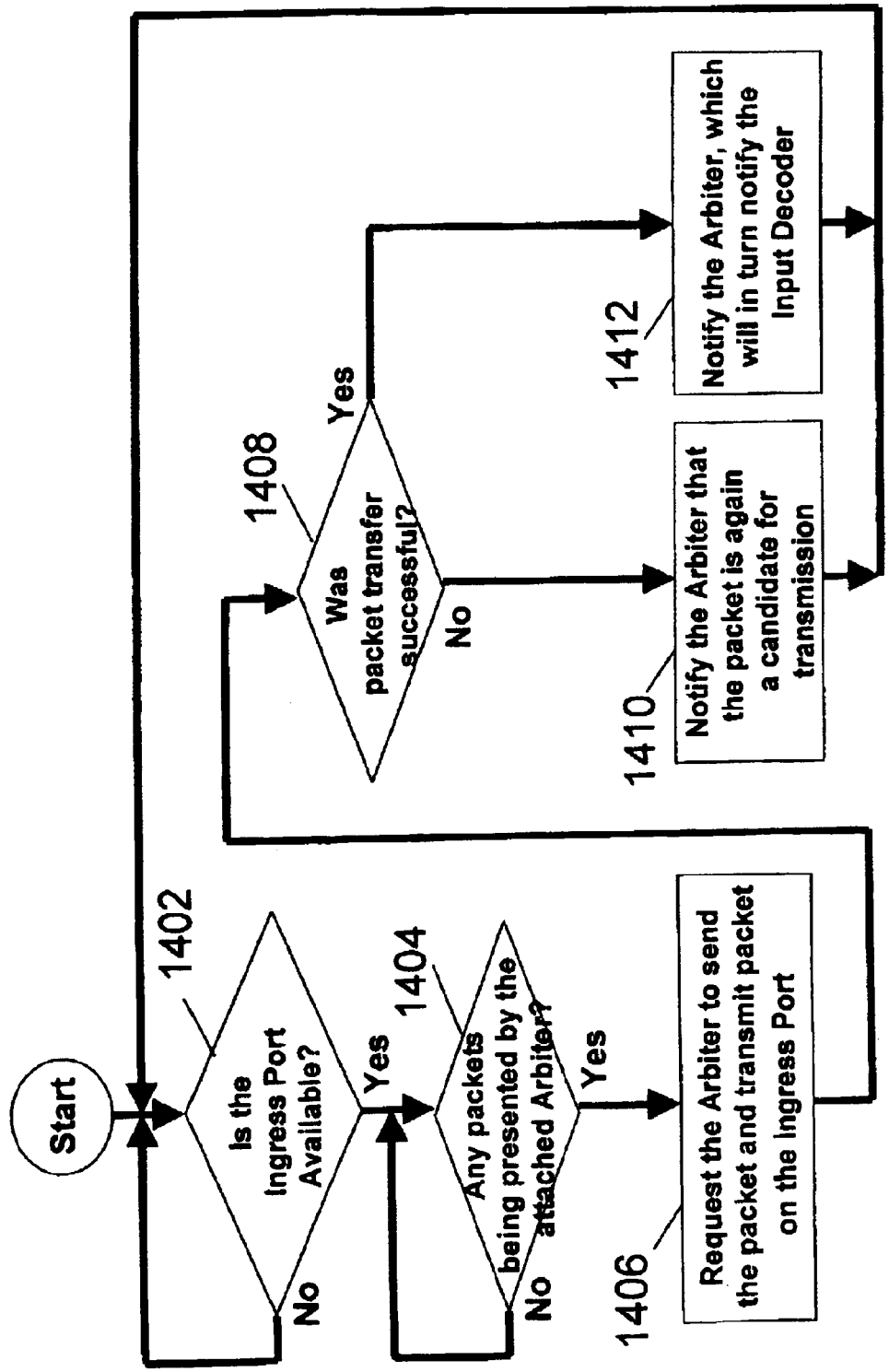
FIG. 14 is a flow diagram of the process of controlling the transmission of packets from the network end points to the nodes of FIG. 2 in accordance with the invention.

Referring now to FIG. 14, the process employed by the fabric end point Ingress Control 97 contained within the Ingress Manager 53 to transmit the next information packet to the Ingress Port 99 is shown.

The Ingress Control 97 checks that the Ingress port is available to receive packets, STEP 1402. If it is available, Ingress Control 97 checks if one or more subsequent packets are available for transfer from the attached Arbiter 66a, 66b, STEP 1404. If no packets are being presented, the Ingress Control 97 will monitor Arbiter 66 communications awaiting the arrival of a new packet. When a packet is being presented, the Ingress Control 97 requests of the attached Arbiter 66a, 66b presenting the selected packet to send the packet, and transmits said packet out the Ingress port 99 to the node, STEP 1406. If the node indicates the transfer was not successful, STEP 1408, the Ingress Control 97 notifies the attached Arbiter 66a, 66b, which will consider the packet as available for retransmission, STEP 1410. If the node indicates that the transfer was successful, the Ingress Control 97 notifies the attached Arbiter 66a, 66b, which will in turn notify the Input Decoder 62 that the packet buffer can be freed up, STEP 1412.

A number of embodiments of the invention have been described. Nevertheless, it will be understood that various modifications may be made without departing from the spirit and scope of the invention. Accordingly, other embodiments are within the scope of the following claims.

What is claimed is:

1. A data storage system, comprising:
   a packet switching network;
   a cache memory; and
   a plurality of directors, one portion of such directors being adapted for coupling to a host computer/server and another portion of the directors being adapted for coupling to a bank of disk drives; wherein
   the plurality of directors and cache memory are interconnected through the packet switching network;
   wherein each one of the directors is adapted to transmit different classes of information packets to another one of the directors or to the cache memory through the packet switching network; one of the classes of the information packets requiring a different degree of latency than another one of the classes of the information packets, each one of the classes having a plurality of different priorities;
   and wherein, of the information packets having been stored in a queue of a transmitting one of the directors, the packet switching network or the memory, having a priority equal to or greater than a current threshold, such threshold being related to the lowest priority a packet can be expected to be accepted by a receiving one of the directors, the next one of the packets for transmission is selected as a function of: a selected one of the classes, followed by the age of such one of the information packets that meets the threshold within the selected one of the classes.

2. The system recited in claim 1 wherein the information type having a lower latency of transmission includes director initiated packets destined to cache memories and messaging among the directors.

3. The system recited in claim 1 wherein a first one of the classes of the information packets including cache memory control reads/writes which pass from the transmitting one of the directors to the cache memory and a second one of the classes of the information packets includes user data passing from the transmitting one of the director to the cache memory.

* * * * *